US011596889B2

(12) United States Patent
Kent et al.

(10) Patent No.: US 11,596,889 B2
(45) Date of Patent: Mar. 7, 2023

(54) AIR FILTER AND METHOD OF USE

(71) Applicant: Pall Corporation, Port Washington, NY (US)

(72) Inventors: Jonathan M. Kent, Portsmouth (GB); Paul D. Roux, Hayling Island (GB)

(73) Assignee: Pall Corporation, Port Washington, NY (US)

( * ) Notice: Subject to any disclaimer, the term of this patent is extended or adjusted under 35 U.S.C. 154(b) by 236 days.

(21) Appl. No.: 16/661,129

(22) Filed: Oct. 23, 2019

(65) Prior Publication Data

US 2021/0121812 A1    Apr. 29, 2021

(51) Int. Cl.
| *B01D 46/00* | (2022.01) |
| *B01D 46/12* | (2022.01) |
| *B01D 46/52* | (2006.01) |
| *F02M 35/024* | (2006.01) |
| *B01D 46/121* | (2022.01) |

(52) U.S. Cl.
CPC ..... *B01D 46/0031* (2013.01); *B01D 46/0001* (2013.01); *B01D 46/121* (2022.01); *B01D 46/521* (2013.01); *F02M 35/02408* (2013.01); *F02M 35/02441* (2013.01); *B01D 2275/30* (2013.01); *B01D 2279/60* (2013.01)

(58) Field of Classification Search
CPC ............ B01D 46/0031; B01D 46/0001; B01D 46/125; B01D 46/521; B01D 2275/30; B01D 2279/60; B01D 2201/12; F02M 35/02408; F02M 35/02441
USPC ....................................... 95/273; 55/486, 521
See application file for complete search history.

(56) References Cited

U.S. PATENT DOCUMENTS

| 3,631,654 | A | 1/1972 | Riely et al. |
| 6,595,742 | B2 | 7/2003 | Scimone |
| 7,758,666 | B2 | 7/2010 | Meerpohl |
| 8,167,980 | B2 | 5/2012 | Hiner et al. |
| 9,573,079 | B2 | 2/2017 | Sivaramakrishnan et al. |
| 2010/0000190 | A1* | 1/2010 | Kidman ................ B01D 46/10 55/502 |
| 2013/0264277 | A1 | 10/2013 | Heidenreich et al. |
| 2014/0331626 | A1* | 11/2014 | Nagy ................ B01D 39/2017 55/487 |
| 2016/0047186 | A1 | 2/2016 | Cady et al. |
| 2016/0061158 | A1 | 3/2016 | Taylor |
| 2017/0368490 | A1* | 12/2017 | Wall ................ B01D 46/0005 |

FOREIGN PATENT DOCUMENTS

| CN | 103357269 A | 10/2013 |
| EP | 2110168 A1 | 10/2009 |
| EP | 2606797 B1 | 7/2014 |
| EP | 3 061 513 A1 | 8/2016 |

(Continued)

OTHER PUBLICATIONS

Singapore Intellectual Property Office, Search Report in counterpart Singapore Patent Application No. 10202009689W, dated Jul. 7, 2021.

(Continued)

*Primary Examiner* — Robert A Hopkins
*Assistant Examiner* — Qianping He
(74) *Attorney, Agent, or Firm* — Leydig, Voit & Mayer, Ltd.

(57) ABSTRACT

Air filters, and air filter devices for use in helicopters, and methods of use, are disclosed.

17 Claims, 9 Drawing Sheets

(56) References Cited

FOREIGN PATENT DOCUMENTS

| JP | H3-254807 A | 11/1991 |
|---|---|---|
| JP | H6-11991 B2 | 2/1994 |
| JP | H6-280150 A | 10/1994 |
| JP | H9-103624 A | 4/1997 |
| JP | 2003-210920 A | 7/2003 |
| JP | 2004188355 A * | 7/2004 |
| JP | 2007-524851 A | 8/2007 |
| JP | 2013-505122 A | 2/2013 |
| JP | 2014226629 A * | 12/2014 |
| WO | WO 2005/072858 A1 | 8/2005 |
| WO | WO 2007/090011 A2 | 8/2007 |
| WO | WO 2011/034782 A1 | 3/2011 |
| WO | WO 2011/086016 A1 | 7/2011 |
| WO | WO 2013/120753 A1 | 8/2013 |

OTHER PUBLICATIONS

Extended European Search Report in counterpart European application No. 20198388.9, dated Nov. 20, 2020.
Canadian Intellectual Property Office, Office Action in counterpart Canadian Patent Application No. 3,096,787, dated Oct. 21, 2021.
China National Intellectual Property Administration, Office Action in counterpart Chinese Patent Application No. 202011138529.1, dated Dec. 8, 2021.

* cited by examiner

AIR FILTER AND METHOD OF USE

BACKGROUND OF THE INVENTION

Air filters are used to protect helicopter engines from the detrimental effects of undesirable material such as dirt, dust, salt, sand, and brownout (e.g., sand and/or dust particles swept up in rotor outwash when landing in dusty environments, which can obstruct a pilot's vision).

However, there is a need for improved air filters for helicopters.

This and other advantages of the present invention will be apparent from the description as set forth below.

BRIEF SUMMARY OF THE INVENTION

An embodiment of the invention provides an air filter comprising (a) a first porous medium comprising a hydrophobic porous fibrous medium having a first surface and a second surface, and a plurality of apertures having a diameter in the range of from about 2 mm to about 35 mm in the first medium, the apertures passing through the first and second surfaces; and, (b) a plurality of second porous media, each second porous medium comprising a hydrophilic porous fibrous medium having a first surface and a second surface, wherein the plurality of second porous media are mounted to the first or second surfaces of the first porous medium, the second porous media covering the apertures of the first porous medium.

In another embodiment, a method of filtering air passing into an engine of a helicopter comprises passing air through an air filter comprising (a) a first porous medium comprising a hydrophobic porous fibrous medium having a first surface and a second surface, and a plurality of apertures having a diameter in the range of from about 2 mm to about 35 mm in the first medium, the apertures passing through the first and second surfaces; and (b) a plurality of second porous media, each second porous medium comprising a hydrophilic porous fibrous medium having a first surface and a second surface, wherein the plurality of second porous media are mounted to the first or second surfaces of the first porous medium, the second porous media covering the apertures of the first porous medium.

In yet another embodiment, a method of making an air filter comprises providing apertures in a first porous medium comprising a hydrophobic porous fibrous medium, and mounting a plurality of second porous media, each second porous medium comprising a hydrophilic porous fibrous medium, to a surface of the first porous medium, wherein the second porous media cover the apertures of the first porous medium.

Embodiments of the invention also include air filter devices comprising an embodiment of the air filter arranged in a housing.

BRIEF DESCRIPTION OF THE SEVERAL VIEWS OF THE DRAWING(S)

FIGS. 2A, 2B, 2C, and 2D are sectional views of a single filter pleat of pleated air filters according to embodiments of the invention, wherein FIG. 2A shows the hydrophilic medium welded to the hydrophobic medium, FIG. 2B shows the filter pleat shown in FIG. 2A with water draining through the hydrophilic medium while the hydrophobic medium allows air flow therethrough, FIG. 2C shows the hydrophilic medium adhesively bonded to the hydrophobic medium, and FIG. 2D shows the filter pleat shown in FIG. 2C with water draining through the hydrophilic medium while the hydrophobic medium allows air flow therethrough. In FIGS. 2A-2D, the hydrophilic medium is located near the base of the filter pleat, in FIG. 2A the hydrophilic medium is located on one side (e.g., the upstream side) of the hydrophobic medium, and in FIG. 2C, the hydrophilic medium is located on the other side (e.g., the downstream side) of the hydrophobic medium.

FIG. 3A shows the results from a static rain test, and FIG. 3B shows the results from a dynamic rain test.

FIGS. 6A-6F shows an embodiment of the filter pack arranged in a housing to provide a filter device. FIG. 6A shows an isometric top view; FIG. 6B shows a front view; FIG. 6C shows a left (top) view, FIG. 6D shows a right (bottom) view; FIG. 6E shows a partial section view along A-A of FIG. 6C; and FIG. 6F shows a section view along B-B of the embodiment shown in FIG. 6E.

DETAILED DESCRIPTION OF THE INVENTION

In accordance with an embodiment of the invention, an air filter is provided comprising (a) a first porous medium comprising a hydrophobic porous fibrous medium having a first surface and a second surface, and a plurality of apertures having a diameter in the range of from about 2 mm to about 35 mm in the first medium, the apertures passing through the first and second surfaces; and, (b) a plurality of second porous media, each second porous medium comprising a hydrophilic porous fibrous medium having a first surface and a second surface, wherein the plurality of second porous media are mounted to the first or second surfaces of the first porous medium, the second porous media covering the apertures of the first porous medium.

In another embodiment, an air filter comprises (a) a first porous medium comprising a hydrophobic porous fibrous medium having a first surface and a second surface, and a plurality of apertures cut out of the first medium, the apertures passing through the first and second surfaces; and, (b) a plurality of second porous media, each second porous medium comprising a hydrophilic porous fibrous medium having a first surface and a second surface, wherein the plurality of second porous media are mounted to the first or second surfaces of the first porous medium, the second porous media covering the apertures of the first porous medium. In a preferred embodiment, the apertures are in the range from about 2 mm to about 25 mm in diameter.

In some embodiments of the air filter, the plurality of apertures are arranged in a predetermined pattern in the first medium.

Embodiments of the invention also include air filter devices and methods of filtering air using the air filters and air filter devices.

An embodiment of an air filter device comprises an air filter comprising a) a first porous medium comprising a hydrophobic porous fibrous medium having a first surface and a second surface, and a plurality of apertures having a diameter in the range of from about 2 mm to about 35 mm in the first medium, the apertures passing through the first and second surfaces; and, (b) a plurality of second porous media, each second porous medium comprising a hydrophilic porous fibrous medium having a first surface and a second surface, wherein the plurality of second porous media are mounted to the first or second surfaces of the first porous medium, the second porous media covering the apertures of the first porous medium; and; a housing, wherein the air filter is arranged in the housing.

In a preferred embodiment of the air filter device, the first porous medium is pleated. In some embodiments, the air filter, which can be pleated, is arranged between an upper support frame and a lower support frame, wherein the upper support frame and the lower support frame are mounted to the housing.

In an embodiment, a method of filtering air passing into an engine of a helicopter comprises passing air through an air filter comprising (a) a first porous medium comprising a hydrophobic porous fibrous medium having a first surface and a second surface, and a plurality of apertures having a diameter in the range of from about 2 mm to about 35 mm in the first medium, the apertures passing through the first and second surfaces; and (b) a plurality of second porous media, each second porous medium comprising a hydrophilic porous fibrous medium having a first surface and a second surface, wherein the plurality of second porous media are mounted to the first or second surfaces of the first porous medium, the second porous media covering the apertures of the first porous medium.

In a preferred embodiment of the method, the air includes water, and the first porous medium continues to allow air to pass through while the second porous media are contacted by water.

In some embodiments of the method, the air includes particulate matter, and the air filter reduces passage of the particulate matter therethrough.

In yet another embodiment, a method of making an air filter comprises providing apertures in a first porous medium comprising a hydrophobic porous fibrous medium, and mounting a plurality of second porous media, each second porous medium comprising a hydrophilic porous fibrous medium, to a surface of the first porous medium, wherein the second porous media cover the apertures of the first porous medium.

Preferably, the method includes pleating the first porous medium before providing the apertures in the medium.

In an embodiment, the first porous medium has a hydrophobic surface treatment. In those embodiments wherein the first porous medium is treated to provide hydrophobicity, the treatment is preferably before providing the apertures in the medium.

Advantageously, effective filtration with reduced filter pressure loss in the presence of water (e.g., a sudden quantity of rain water, snow (particularly wet snow) and/or ice) is provided. This is particularly advantageous when the filter, or part of the filter, is horizontally mounted.

Each of the components of the invention will now be described in more detail below, wherein like components have like reference numbers.

Figure 1:
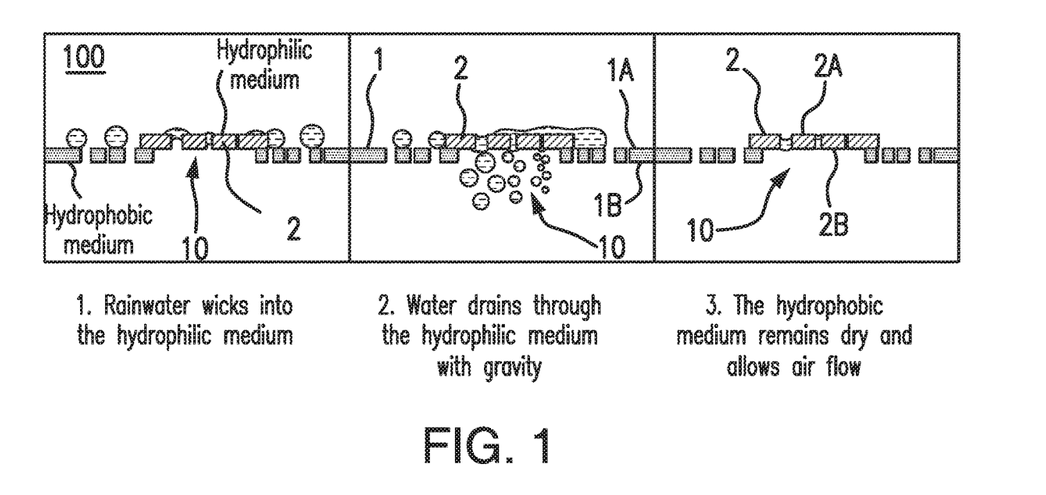
FIG. 1 is a schematic cross-sectional view of an air filter according to an embodiment of the invention, wherein water drains through the hydrophilic medium while the hydrophobic medium remains substantially dry and allows air flow therethrough.

FIG. 1 shows a schematic cross-sectional view of an air filter 100 according to an embodiment of the invention, wherein water drains through the plurality of second porous media 2 (hydrophilic media) while the first porous medium 1 (hydrophobic medium) remains essentially dry and allows air flow therethrough. In this schematic, the hydrophilic media each have a first surface 2A and a second surface 2B, and cover apertures 10 in the hydrophobic medium which has a first surface 1A and a second surface 1B. The hydrophilic media can be fixed to the hydrophobic medium as is known in the art, e.g., by welding and/or adhesive, and the hydrophilic media can be fixed to either surface of the hydrophobic medium.

Figure 2A:
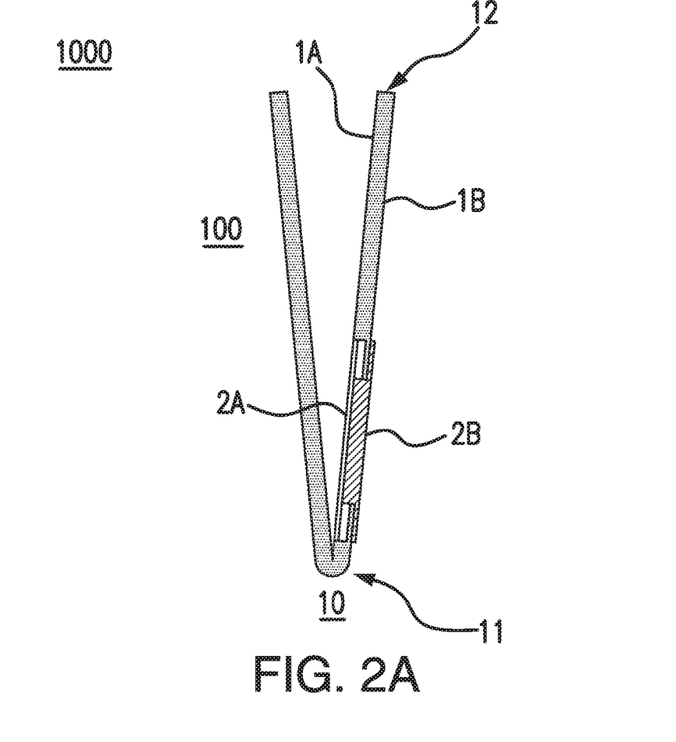
Figure 2B:
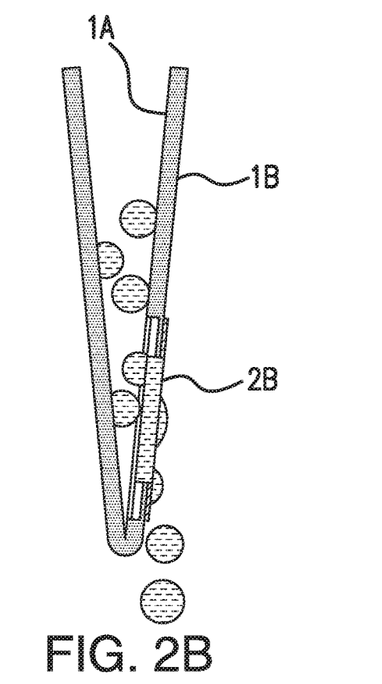
Figure 2C:
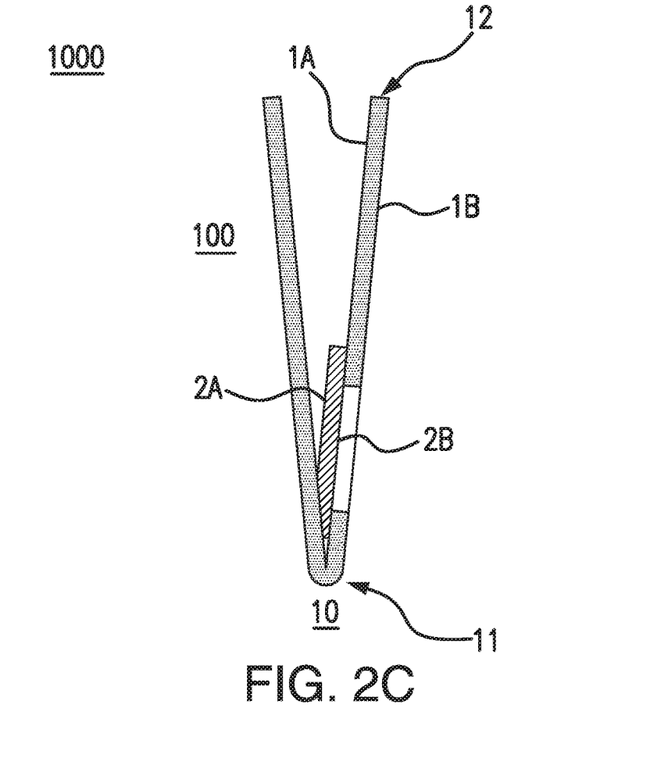
Figure 2D:
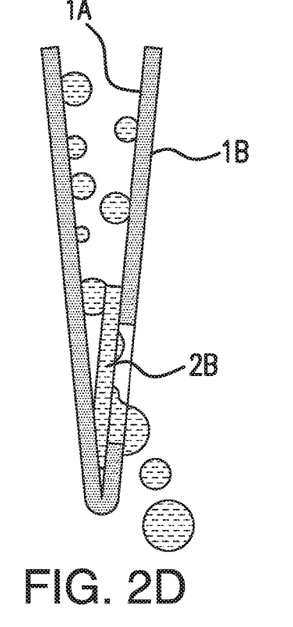

For example, in the embodiment of the air filter 100 shown in FIGS. 2A-2D, wherein the air filter is a pleated filter 1000, and pleat 10 is shown, FIGS. 2A and 2B show the hydrophilic medium arranged (e.g., fixed by welding) on the second surface (e.g., the downstream surface) of the hydrophobic medium, and FIGS. 2C and 2D show the hydrophilic medium arranged (e.g., fixed by adhesive bonding) on the first surface (e.g., the upstream surface) of the hydrophobic medium.

An air filter can have any suitable pore structure, e.g., a pore size (for example, as evidenced by bubble point, or by $K_L$ as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element. The pore structure used depends on the composition of the fluid to be treated, and the desired effluent level of the treated fluid.

Typically, the pore structure of the air filter removes undesirable material such as particulate matter, e.g., any one or more of the following: dirt, dust, salt, and/or sand.

In accordance with an embodiment of the invention, the first and second porous media have mean pore sizes in the range of from about 30 μm to about 40 μm Typically, both media in an air filter have the same mean pore sizes.

Figure 4:
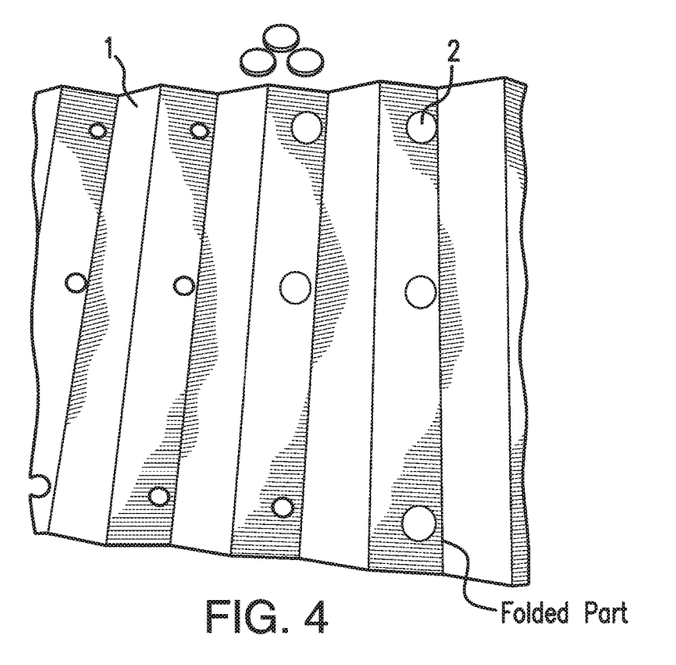
FIG. 4 shows a pleated filter that has been unfolded, showing the hydrophobic medium with apertures and hydrophilic media covering some of the apertures.
Figure 5A:
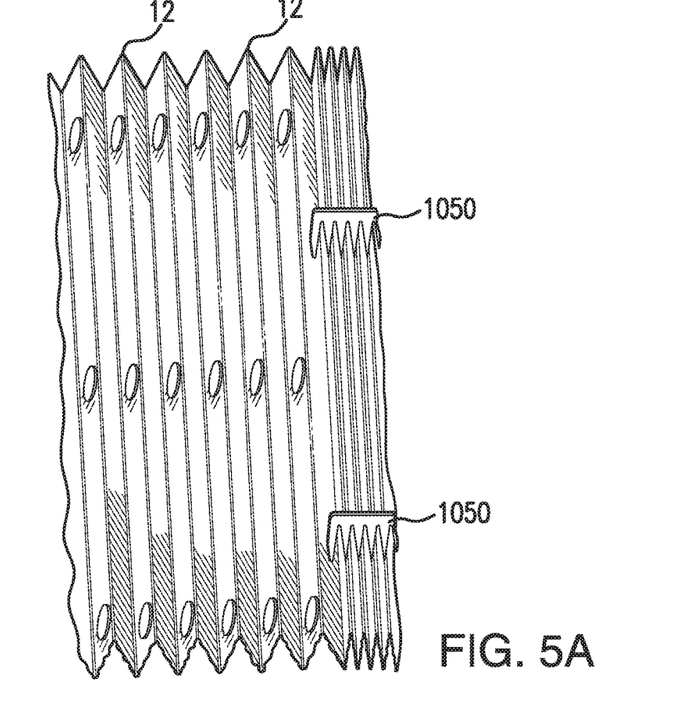
FIG. 5A shows a surface of a pleated filter, wherein the hydrophilic media are located near the base of the pleats of the hydrophobic medium.
Figure 5B:
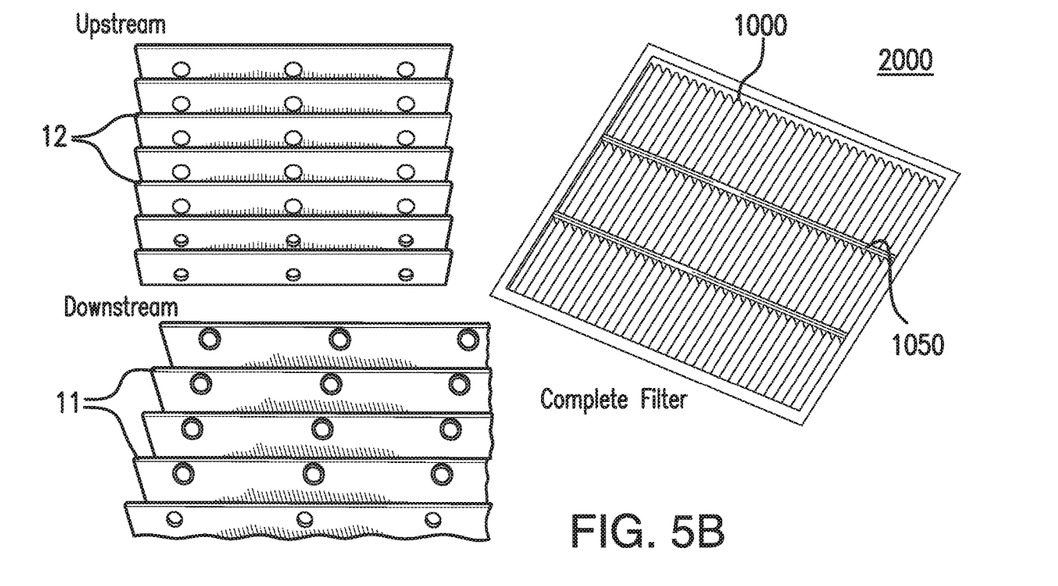
FIG. 5B shows upstream and downstream surfaces of a pleated filter, wherein the hydrophilic media are arranged on the downstream surface of hydrophobic medium, and also shows the pleated filter arranged in a housing to provide a filter device.
Figure 6A:
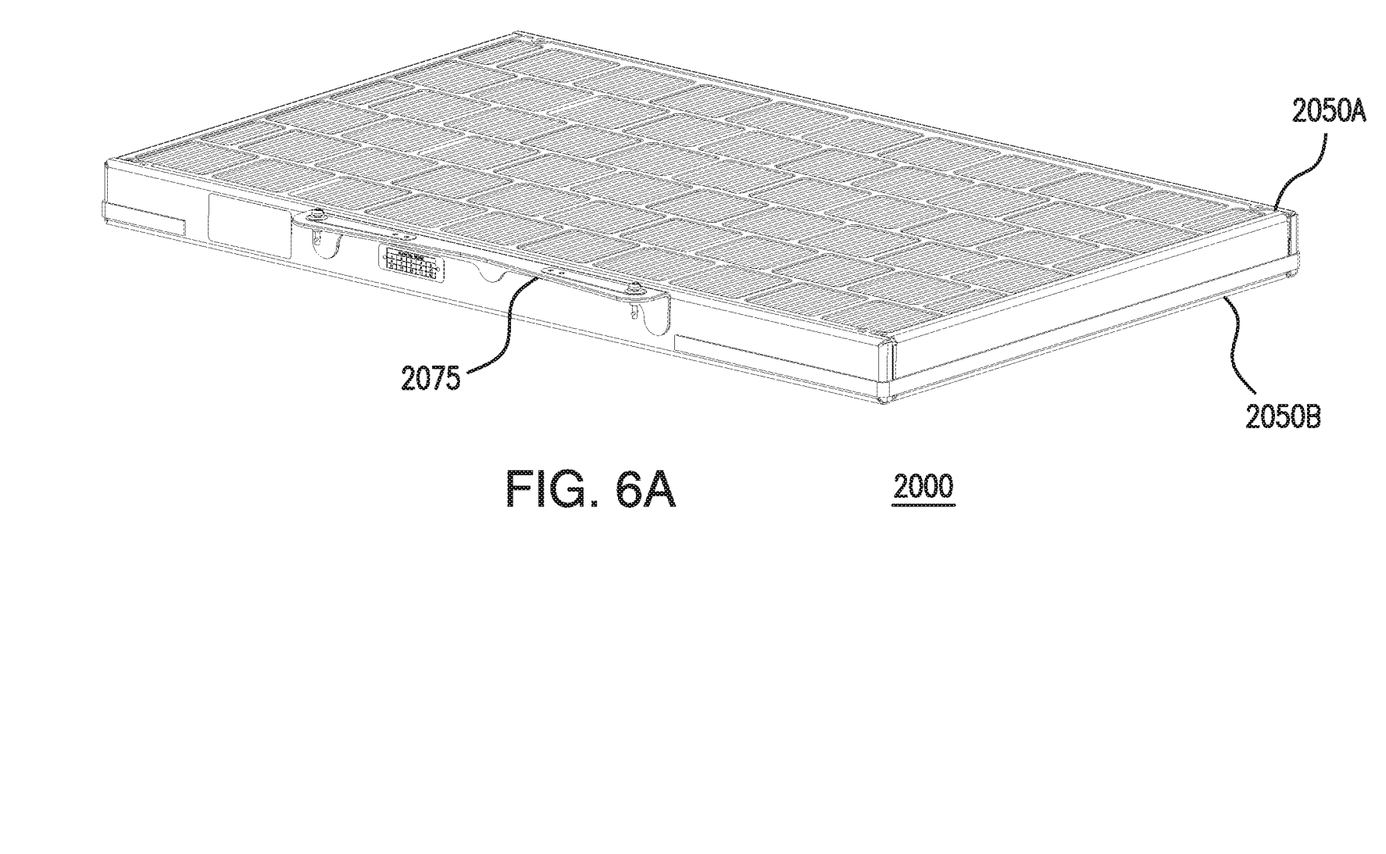
Figures 6B, 6C:
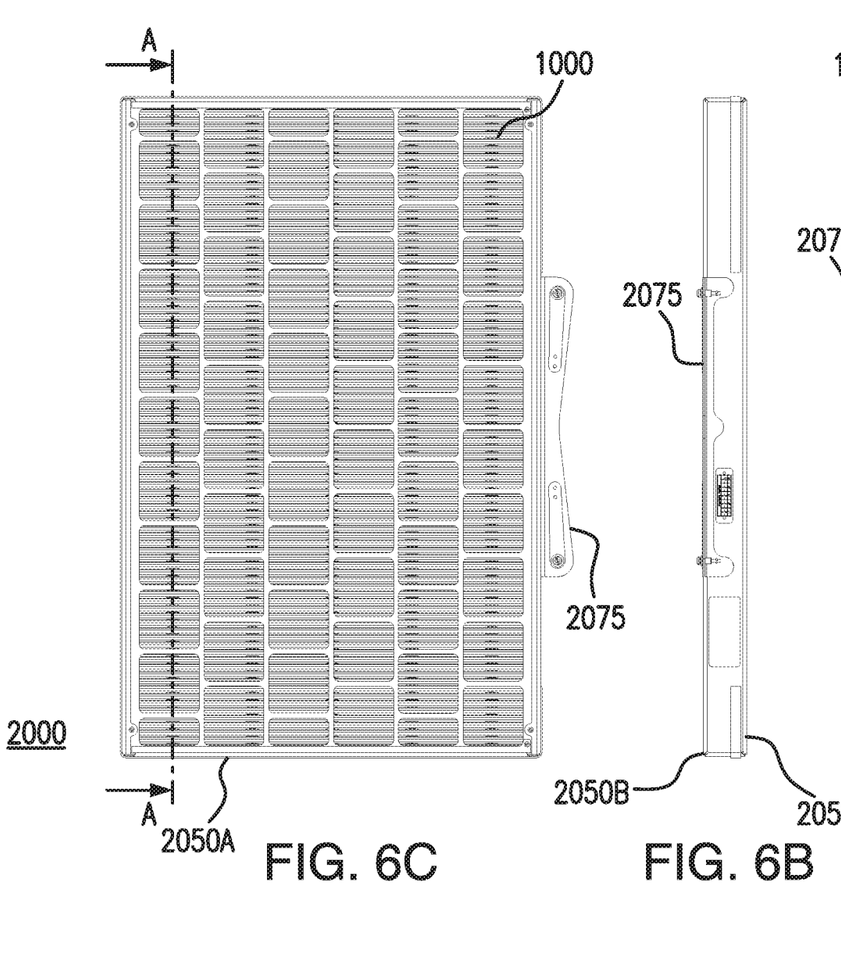
Figure 6D:
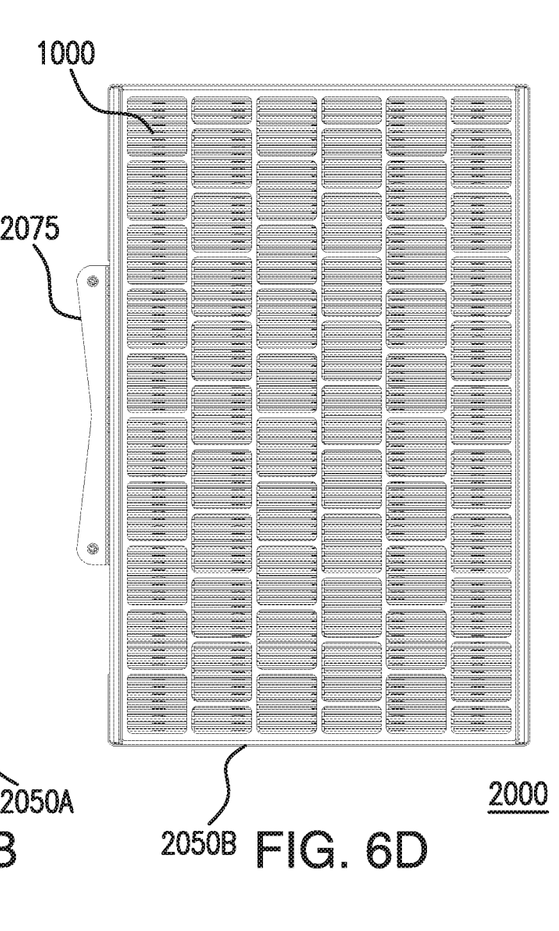
Figure 6E:
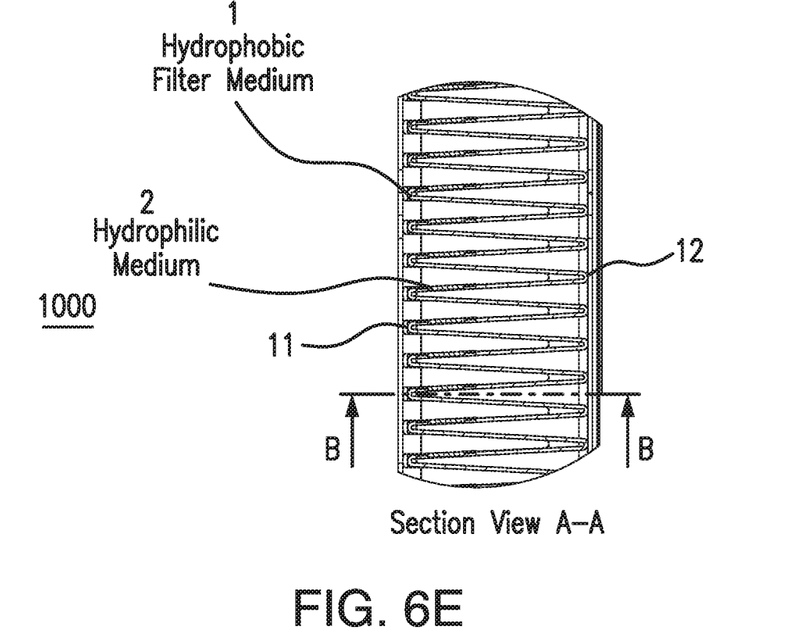
Figure 6F:
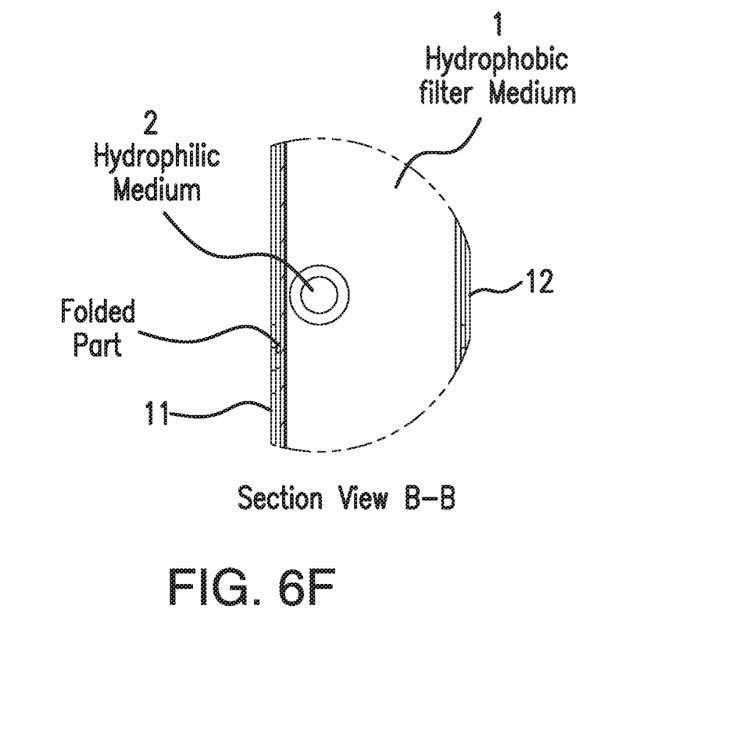

The apertures can be arranged in any desired pattern in the hydrophobic medium. Typically, in those embodiments wherein the final configuration of the air filter is a pleated filter 1000, as shown in, for example, FIGS. 2A, 2C, 5A, 5B, and 6E, the apertures are located closer to the bases 11 of the pleats 10 than the peaks 12 of the pleats; for example, as close to the base of the pleat without being in/on the folded part of the pleat (see, FIG. 4).

The apertures can have any suitable hole diameters. Typically, the apertures have hole diameters in the range of about 2 mm to about 35 mm in the first (hydrophobic) medium, preferably in the range of from about 4 mm to about 25 mm. Preferably, the hole diameters of the apertures in a given first medium are essentially uniform.

The distance between the apertures can be varied. Typically, the apertures are spaced apart from each other by a distance in the range of from about 40 mm to about 175 mm, preferably in the range of from about 50 mm to about 150 mm; e.g., along the length of the pleat, parallel to the base of the pleat.

The total hole diameter of the apertures in the filter can be any desired percentage of the total surface area of the first medium. For example, the apertures have a total hole diameter area in the range of about 0.1% to about 15% of the total surface area of the first medium, typically about 0.1% to about 10% of the total surface area of the first medium.

The porous media can have any desired water breakthrough pressure, which is the pressure at which liquid water passes through the porous medium and emerges from the surface. The water breakthrough pressure can be determined as is known in the art.

Typically, the first porous medium (the hydrophobic fibrous porous medium) has a water breakthrough pressure of about 15 mbar (6" wg) or more, preferably, about 20 mbar (about 8" wg), or more.

Typically, the second porous medium (the hydrophilic fibrous porous medium) has a water breakthrough pressure of about 3 mbar (about 1.2" wg), or less, in some embodiments, about 0 mbar (about 0" wg).

The surface characteristics of the filter can be modified (e.g., to affect the water breakthrough pressure, to include a surface charge, e.g., a positive or negative charge, and/or to alter the polarity, hydrophobicity, or hydrophilicity of the surface) by wet or dry oxidation, by coating or depositing a polymer on the surface, or by a grafting reaction.

The filter and the filter device can include additional elements, layers, or components, that can have different structures and/or functions, e.g., at least one of any one or more of the following: prefiltration, support, drainage, spacing and cushioning. Illustratively, the filter and filter device can also include at least one additional element such as a mesh and/or a screen. In the embodiments shown in FIGS. 5A and 5B, the filter further comprises a support comb 1050 that assists in maintaining the spacing between the pleats. In the embodiment shown in FIGS. 6A-6D, the filter device further comprises upper and lower support frames 2050A, 2050B.

A variety of polymers are suitable for producing fibrous porous media according to embodiment of the invention. Suitable polymers include, for example, polyester, polyamides, polyimides, polyvinylidene halides (including polyvinylidene fluoride (PVDF)), polyolefins, such as polypropylene and polymethylpentene, and cellulosic polymers (such as cellulose e.g., a sulfone polymer).

The first porous fibrous medium can be initially hydrophobic, or treated to provide hydrophobicity or increased hydrophobicity, as is known in the art.

In accordance with embodiments of the invention, the air filter can have a variety of configurations, including planar and pleated.

The filters can be produced using techniques known in the art. For example, a variety of pleating techniques are known in the art. Apertures can be produced by, for example, ultrasonic cutting, laser treatment, water jetting, etc. The second porous media can be mounted to the first porous media by, for example, heat welding or ultrasonic welding.

Typically, embodiments of the air filter are arranged in a housing to provide a filter device. A variety of housing configurations and housing materials are suitable depending on, for example, the design of the helicopter. For example, the housing can be metal.

FIGS. 5B, and 6A-6F show illustrative filter devices 2000, in FIGS. 6A-6D, the filter devices also include upper and lower support frames 2050A, 2050B, and a mounting bracket 2075.

Figure 7:
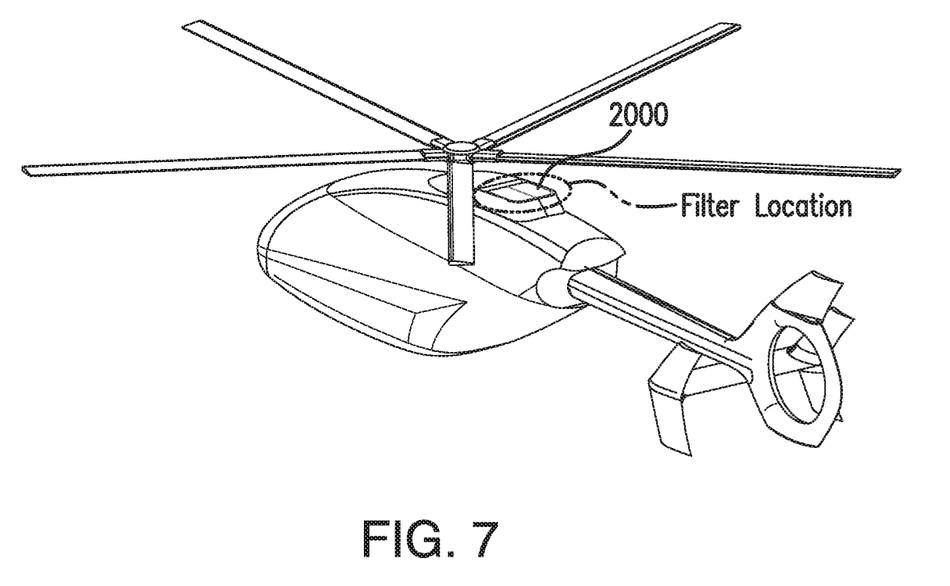
FIG. 7 shows an isometric view of an illustrative installation of a filter device according to an embodiment of the invention in a helicopter.

Filter devices can be arranged in or on a helicopter as appropriate, depending on the design of the helicopter. FIG. 7 illustrates one location, but the embodiments of the invention are not so limited.

The following examples further illustrate the invention but, of course, should not be construed as in any way limiting its scope.

Example 1

This example demonstrates the effectiveness of an air filter according to an embodiment of the invention in a Static Rain Test compared to the use of a fully hydrophilic filter and a fully hydrophobic filter.

The Static Rain Test simulates conditions where a filter is exposed to water when no air flow is passing through the filter initially, and then, after a period of time, air flow through the filter commences; i.e. to represent "leaving the filter out in the rain and then starting the engine."

The first and second porous fibrous media in the air filter according to according to an embodiment of the invention are each polyester non-woven fibrous media with a mean pore size of about 35 μm and a maximum pore size of about 65 μm. The first porous medium has a hydrophobic surface treatment to provide a water breakthrough pressure of about 30 mbar (about 12" wg), the second porous medium has a water breakthrough pressure of about 0 mbar (about 0" wg).

The first porous fibrous medium is pleated, partially unfolded, placed over an anvil, punched, and an ultrasonic horn is used to bond the second fibrous media over the punched out apertures of the first porous medium.

The fully hydrophobic porous medium is a polyester non-woven fibrous medium with a mean pore size of 35 μm, a maximum pore size of approximately 65 μm and a water breakthrough pressure of about 30 mbar (12" wg). The fully hydrophobic porous medium is pleated.

The fully hydrophilic porous medium is a polyester non-woven fibrous medium with a mean pore size of 35 μm, a maximum pore size of approximately 65 μm and a water breakthrough pressure of about 0 mbar (0" wg). The fully hydrophilic porous medium is pleated.

Figure 3A:
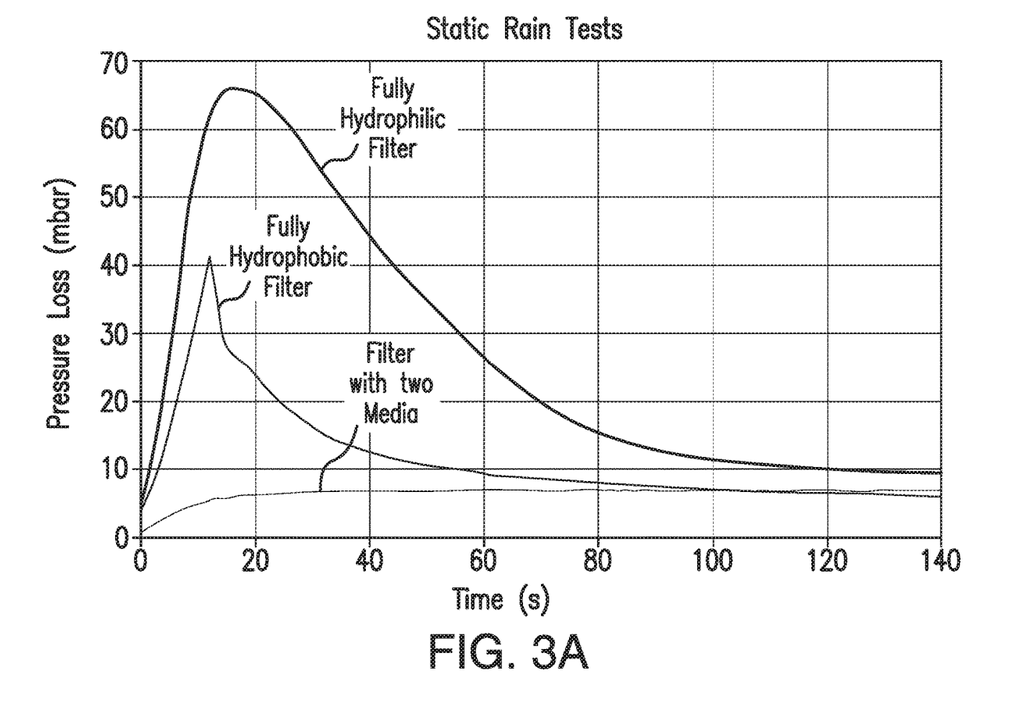
FIGS. 3A and 3B are graphs showing the comparative results from a rain tests using a hydrophilic filter, a hydrophobic filter, and a filter according to an embodiment of the invention.

As shown in FIG. 3A, the peak differential pressure of the air filter in accordance with an embodiment of the invention is about 10 mbar, as compared to about 41 mbar for the hydrophobic medium and about 67 mbar for the hydrophilic medium.

The water release of the air filter according the embodiment of the invention, at the point of peak differential pressure is about 4 inches/hour, as compared to about 150 inches/hour for the hydrophobic medium and about 8 inches/hour for the hydrophilic medium.

Example 2

This example demonstrates the effectiveness of an air filter according to an embodiment of the invention in a Dynamic Rain Test compared to the use of a fully hydrophilic filter and a fully hydrophobic filter.

The Dynamic Rain Test simulates conditions where air flow is already passing through the dry filter and then the filter is exposed to water; i.e. to represent "running the engine in dry conditions, and then it starts raining."

The media used are the same as in Example 1.

Figure 3B:
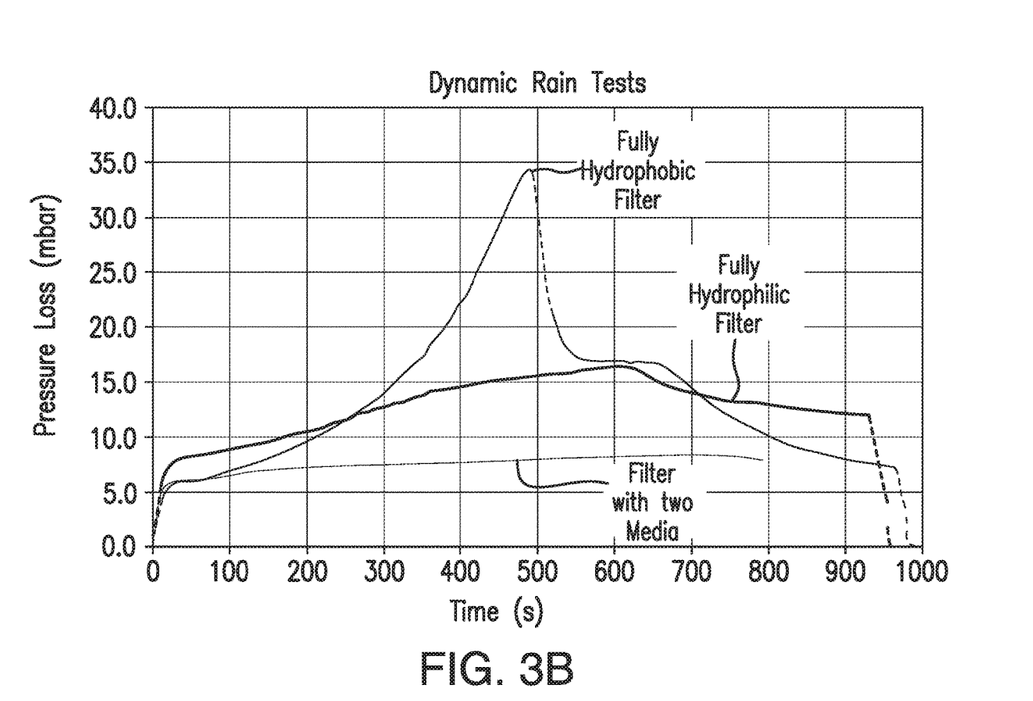

As shown in FIG. 3B, the peak differential pressure of the air filter in accordance with an embodiment of the invention is about 8 mbar, as compared to about 34 mbar for the hydrophobic medium and about 16 mbar for the hydrophilic medium.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An air filter comprising
   (a) a pleated first porous medium having a plurality of pleats, each pleat having a base and a peak, comprising a hydrophobic porous fibrous medium having a first surface and a second surface, and a plurality of apertures having a diameter in the range of from 2 mm to 35 mm in the first medium, the plurality of apertures passing through the first and second surfaces, wherein all of the plurality of apertures are arranged closer to the bases of the pleats than to the peaks of the pleats; and,
   (b) a plurality of second porous media, each second porous medium comprising a hydrophilic porous fibrous medium having a first surface and a second surface, wherein the plurality of second porous media are mounted to the first or second surfaces of the first porous medium, the second porous media covering the plurality of apertures of the first porous medium.

2. The air filter of claim 1, wherein the plurality of apertures are arranged in a predetermined pattern in the first medium.

3. The air filter of claim 1, having a total surface area, wherein the plurality of apertures have a total hole diameter area in the range of 0.1% to 15% of the total surface area.

4. The air filter of claim 1, wherein the plurality of apertures are spaced apart by a distance in the range of from 40 mm to 175 mm.

5. The air filter of claim 1, wherein the hydrophobic porous fibrous medium and/or the hydrophilic porous fibrous medium comprise polyester.

6. The air filter of claim 1, wherein the second porous media are fixed on the first surface of the first porous medium.

7. The air filter of claim 1, wherein the second porous media are fixed on the second surface of the first porous medium.

8. An air filter device comprising:
   an air filter comprising:
   a) a pleated first porous medium having a plurality of pleats, each pleat having a base and a peak, comprising a hydrophobic porous fibrous medium having a first surface and a second surface, and a plurality of apertures having a diameter in the range of from 2 mm to 35 mm in the first medium, the apertures passing through the first and second surfaces, wherein all of the plurality of apertures are arranged closer to the bases of the pleats than to the peaks of the pleats; and,
   (b) a plurality of second porous media, each second porous medium comprising a hydrophilic porous fibrous medium having a first surface and a second surface, wherein the plurality of second porous media are mounted to the first or second surfaces of the first porous medium, the second porous media covering the plurality of apertures of the first porous medium; and;
   a housing, wherein the air filter is arranged in the housing.

9. The air filter of device of claim 8, wherein the air filter is arranged between an upper support frame and a lower support frame, wherein the upper support frame and the lower support frame are mounted to the housing.

10. A method of filtering air passing into an engine of a helicopter, the method comprising passing air through an air filter comprising:
    (a) a pleated first porous medium having a plurality of pleats, each pleat having a base and a peak, comprising a hydrophobic porous fibrous medium having a first surface and a second surface, and a plurality of apertures having a diameter in the range of from 2 mm to 35 mm in the first medium, the apertures passing through the first and second surfaces, wherein all of the plurality of apertures are arranged closer to the bases of the pleats than to the peaks of the pleats; and
    (b) a plurality of second porous media, each second porous medium comprising a hydrophilic porous fibrous medium having a first surface and a second surface, wherein the plurality of second porous media are mounted to the first or second surfaces of the first porous medium, the second porous media covering the plurality of apertures of the first porous medium.

11. The method of claim 10, wherein the air includes water, and the first porous medium continues to allow air to pass through while the second porous media are contacted by water.

12. The method of claim 10, wherein the air includes particulate matter, and the air filter reduces passage of the particulate matter therethrough.

13. A method of making an air filter, the method comprising:

(a) providing a plurality of apertures in a pleated first porous medium having a plurality of pleats, each pleat having a base and a peak, comprising a hydrophobic porous fibrous medium having a first surface and a second surface, and a plurality of apertures having a diameter in the range of from 2 mm to 35 mm in the first medium, the apertures passing through the first and second surfaces, wherein all of the plurality of apertures are arranged closer to the bases of the pleats than to the peaks of the pleats; and (b) mounting a plurality of second porous media, each second porous medium comprising a hydrophilic porous fibrous medium having a first surface and a second surface, wherein the plurality of second porous media are mounted to the first or second surfaces of the first porous medium, and wherein the second porous media cover the plurality of apertures of the first porous medium.

14. The air filter of device of claim 8, wherein the air filter is arranged between an upper support frame and a lower support frame, wherein the upper support frame and the lower support frame are mounted to the housing.

15. The method of claim 11, wherein the air includes particulate matter, and the air filter reduces passage of the particulate matter therethrough.

16. The air filter of claim 4, wherein the second porous media are fixed on the first surface of the first porous medium.

17. The air filter of claim 4, wherein the second porous media are fixed on the second surface of the first porous medium.

* * * * *